(12) United States Patent
Tanaka et al.

(10) Patent No.: US 8,779,644 B2
(45) Date of Patent: Jul. 15, 2014

(54) ROTATING ELECTRICAL MACHINE AND METHOD FOR MANUFACTURING A STATOR THEREOF

(75) Inventors: Yuichiro Tanaka, Hitachinaka (JP); Takashi Ishigami, Hitachinaka (JP); Kota Sakuma, Mishima (JP); Toshihiko Mato, Numazu (JP)

(73) Assignee: Kokusan Denki Co., Ltd., Numazu-shi (JP)

( * ) Notice: Subject to any disclaimer, the term of this patent is extended or adjusted under 35 U.S.C. 154(b) by 285 days.

(21) Appl. No.: 13/028,294

(22) Filed: Feb. 16, 2011

(65) Prior Publication Data

US 2011/0241472 A1  Oct. 6, 2011

(30) Foreign Application Priority Data

Mar. 31, 2010 (JP) ................................ 2010-081855

(51) Int. Cl.

| H02K 3/04 | (2006.01) |
|---|---|
| H02K 17/00 | (2006.01) |
| H02K 19/00 | (2006.01) |
| H02K 21/00 | (2006.01) |
| H02K 23/26 | (2006.01) |
| H02K 27/02 | (2006.01) |
| H02K 3/12 | (2006.01) |
| H02K 3/28 | (2006.01) |
| H02K 5/22 | (2006.01) |
| H02K 15/095 | (2006.01) |

(52) U.S. Cl.
CPC .. *H02K 3/12* (2013.01); *H02K 3/28* (2013.01); *H02K 5/225* (2013.01); *H02K 15/095* (2013.01)

USPC .............. 310/208; 310/71; 310/179; 310/184

(58) Field of Classification Search
CPC ........................................................ H02K 3/12
USPC .................... 310/71, 179, 184, 208
IPC ............ H02K 3/04, 17/00, 19/00, 21/00, 23/26, H02K 27/02
See application file for complete search history.

(56) References Cited

U.S. PATENT DOCUMENTS

| 6,417,592 B2 * | 7/2002 | Nakamura et al. ............. 310/184 |
| 6,998,750 B2 * | 2/2006 | Anma et al. ................... 310/198 |
| 7,408,281 B2 | 8/2008 | Kinashi |

(Continued)

FOREIGN PATENT DOCUMENTS

| JP | 10-271770 A | 10/1998 |
| JP | 2000-232745 A | 8/2000 |

(Continued)

OTHER PUBLICATIONS

Japanese Office Action with English Translation dated Feb. 4, 2014 (eight (8) pages).

*Primary Examiner* — John K Kim
(74) *Attorney, Agent, or Firm* — Crowell & Moring LLP

(57) ABSTRACT

A group of coils used in a stator of a rotating electrical machine, wound continuously upon a divided core with a crossover wire, in which 2N coils (where N is a natural number) are arranged at approximately regular intervals, wherein a winding direction of N coils, which are first through Nth continuously wound coils, of a front half of the 2N coils, and a winding direction of rear half coils which are (N+1)-st through (2N)-th continuously wound coils, are opposite.

5 Claims, 16 Drawing Sheets

(56) References Cited

U.S. PATENT DOCUMENTS

| | | | |
|---|---|---|---|
| 7,498,709 B2* | 3/2009 | Shteynberg et al. | 310/184 |
| 7,560,839 B2* | 7/2009 | Sumiya et al. | 310/71 |
| 7,692,351 B2* | 4/2010 | Hattori | 310/198 |
| 8,294,324 B2* | 10/2012 | Ishigami et al. | 310/206 |
| 2004/0051417 A1 | 3/2004 | Yamazaki et al. | |
| 2006/0022544 A1* | 2/2006 | Kinashi | 310/179 |
| 2006/0152188 A1* | 7/2006 | Yasuhara et al. | 318/727 |
| 2007/0052307 A1* | 3/2007 | Yoshida et al. | 310/71 |
| 2007/0182265 A1* | 8/2007 | Makino et al. | 310/179 |
| 2008/0284270 A1* | 11/2008 | Tajima et al. | 310/156.53 |
| 2011/0241472 A1* | 10/2011 | Tanaka et al. | 310/208 |

FOREIGN PATENT DOCUMENTS

| | | |
|---|---|---|
| JP | 2000-261990 A | 9/2000 |
| JP | 2002-176753 A | 6/2002 |
| JP | 2003-189525 A | 7/2003 |
| JP | 2006-50690 A | 2/2006 |
| JP | 2006-296146 A | 10/2006 |
| JP | 2010-35400 A | 2/2010 |

* cited by examiner

ROTATING ELECTRICAL MACHINE AND METHOD FOR MANUFACTURING A STATOR THEREOF

INCORPORATION BY REFERENCE

The disclosure of the following priority application is herein incorporated by reference: Japanese Patent Application No. 2010-081855 filed Mar. 31, 2010.

BACKGROUND OF THE INVENTION

1. Field of the Invention

The present invention relates to a rotating electrical machine such as a motor or a generator or the like.

2. Description of Related Art

In recent years worldwide efforts for reducing greenhouse gases and saving energy have been made, leading to a rapid progress in the implementation of electrically powered automobiles. There are severe constraints upon the space available for installing an in-vehicle electric motor (rotating electrical machine), and moreover it is required to obtain high output with a limited battery voltage. As one means for satisfying demands for compactness together with high output for an electric motor, an electric motor employing a concentrated winding for the stator core can be used, in which thick coil wires are densely wound on divided cores of the stator, resulting in a high space factor for the stator coils.

On the other hand, as one example of counter measures for lowering the motor cost with the prior art, continuous winding of coils for a plurality of stator slots has been adopted, by which the number of connection points can be reduced and thus the assembly work has been simplified. When continuous winding is not employed, then lead wires are brought out from each coil in each slot, and the same number of connections must be made as the number of lead wires. Additionally, as such connections are done while the coils are being installed in the slots and a connection wiring plate is used for these connections, the work amount and the cost for an electric motor are pushed up due to the labor of establishing these connections.

If the coils are wound as a continuous winding, according to the structure of the coils, sometimes the connections of neutral points are done on the crossover wires. In such a case, the ease of assembly is highly hindered, if no suitable connection method is employed for the neutral point connection. In Japanese Laid-Open Patent Publication 2003-189525, a stator core is described in which a plurality of coils are wound as a four-in-parallel Y connected winding, with coils of each different phase being wound continuously (with one coil in every other slot). Since, when the stator coil is assembled with this method, portions of the crossover wires where the neutral points of two of the three phases overlap appear at three locations, accordingly a method is described for creating a neutral point for all of the three phases by establishing connections to these three portions, and by connecting these three locations together using connecting wires. However with this method, since fused connections need to be provided at the three locations in the state in which the stator coil is already installed upon the stator core, accordingly the efficiency of the assembly task is bad, and this causes increase of the man-hours required for assembly. Furthermore, since the lead wires of the coils that are connected as four-in-parallel in a Y-connection pattern and the respective lead wires of the 3 phases are far separated from each other, accordingly a connection wiring plate needs to be used with this method, and this causes the cost of the motor to become higher.

A continuous winding for a divided core of a motor with a concentrated winding is disclosed in Japanese Laid-Open Patent Publication 2006-50690. Here, the coils of same phase of a stator coil for 14 poles and 12 slots are wound as four continuous windings, and constitute a stator coil wound with 2-in-series 2-in-parallel Y connected wiring. Furthermore, by the four continuously wound coils, which are all wound in same direction, for one of the U phase, the V phase, and the W phase, the locations of lead wires for each phase and the locations of neutral point connections for each phase are respectively gathered at positions opposite to each other on the circumference of the stator. With the construction disclosed in Japanese Laid-Open Patent Publication 2006-50690, it is possible to reduce the number of neutral point connection points, but a connection wiring plate is still necessary for connecting together the three neutral points with the method described there, since the neutral points of the U phase coil, the V phase coil, and the W phase coil are still located at different positions.

SUMMARY OF THE INVENTION

Accordingly, the objective of the present invention is to provide a stator coil with which no connection wiring plate such as used in the prior art is required, and to provide a rotating electrical machine that uses that stator coil.

With the rotating electrical machine of the present invention, a divided core is employed for the stator, each of the stator coils consists of an even number of coils, and a group of coils that is continuously wound is used as a concentrated winding for each divided core. In concrete terms, with this stator coil, for example, three of these groups of coils are used for the U phase, the V phase, and the W phase respectively, and each of the continuous winding coils for each of the phases, for example the coil for the U phase, consists of an even number of continuously wound coils, with the front half portion of this even number of coils and the rear half portion thereof being wound in opposite directions. By using groups of coils that are continuously wound in this manner, it is possible to implement a stator coil without using any connection wiring plate.

According to the 1st aspect of the present invention, a group of coils used in a stator of a rotating electrical machine, wound continuously upon a divided core with a crossover wire, in which 2N coils (where N is a natural number) are arranged at approximately regular intervals, wherein a winding direction of N coils, which are first through Nth continuously wound coils, of a front half of the 2N coils, and a winding direction of rear half coils which are (N+1)-st through (2N)-th continuously wound coils, are opposite.

According to the 2nd aspect of the present invention, in a group of coils according to the 1st aspect, it is preferred that the crossover wire at a end of Nth coil winding end is bent at an angle of greater than 90° so that the crossover wire at the Nth coil winding end is bent closer to the core in the winding direction.

According to the 3rd aspect of the present invention, in a group of coils according to the 1st aspect, it is preferred that the crossover wire at (N+1)-th coil winding end is bent at an angle of less than 90° so that the crossover wire at the (N+1)-th coil winding end is bent closer to the core in the winding direction.

According to the 4th aspect of the present invention, in a group of coils according to the 1st aspect, it is preferred that the crossover wire at the end of the winding of the Nth coil is bent at an angle of greater than 90° so that the crossover wire at the Nth coil winding end is bent closer to the core in the winding direction, and the crossover wire at the end of the winding of the (N+1)-th coil is bent at an angle of less than 90° so that the crossover wire at the (N+1)-th coil winding end is bent closer to the core in the winding direction.

According to the 5th aspect of the present invention, a stator coil used in a rotating electrical machine, including three groups of coils with each group of coils according to the 1st aspect, which three groups of coils are used respectively for U phase, V phase, and W phase, and wherein neutral points of these three groups of coils are connected by connecting together central portions of these three groups of coils are connected together with a connection terminal.

According to the 6th aspect of the present invention, a rotating electrical machine employing the stator coil according to the 5th aspect and having 4N poles and 6N slots (where N is a natural number).

According to the 7th aspect of the present invention, a method of manufacturing a group of coils according to the 1st aspect by winding coils upon a plurality of divided cores using a flyer mounted upon a three orthogonal-axis robot, comprising: a process of supporting the plurality of divided cores upon movable support jigs; a process of lining up the plurality of divided cores supported upon the support jigs; a process of shifting the support jig so as to ensure an appropriate winding track for the flyer; and a process of, after having ensured the winding track for the flyer, winding coil conductors upon the plurality of divided cores; wherein, in the winding process, one group of continuously wound coils is manufactured by repeating a first process of winding a coil conductor upon one divided core with the flyer, a second process of forming a bridging wire at the end of the winding of the coil conductor of this single coil on this divided core, and a third process of hitching the crossover wire to a pin; and wherein the winding direction of the N coils in the front half of the 2N coils and the winding direction of the N coils in the rear half of the 2N coils are opposite.

According to the 8th aspect of the present invention, a method of manufacturing a stator coil of a three phase rotating electrical machine, comprising: a process of providing three groups of coils manufactured by the method according to the 7th aspect; a process of combining the three groups of coils into a combination so as to be used for a U phase, a V phase, and a W phase, and forming the three groups of coils into a ring; and a process of connecting neutral points of the three groups of coils by connecting together central portions of the three groups of coils with a connection terminal.

According to the 9th aspect of the present invention, a jig for, in the method of manufacturing a stator coil according to the 8th aspect, assembling the combination of three groups of coils into a ring, comprising a same number of divided core support members as the number of divided cores of the stator coil, and wherein: that plurality of the divided core support members are mutually coupled together so as to be capable of being deformed into a ring; and each of the divided core support members includes a holding member for supporting one divided core of the stator coil.

According to the 10th aspect of the present invention, a divided core used in a group of coils according to the 1st aspect, or used in a stator coil according to the 5th aspect, wherein an engagement portion is provided for engaging to the holding member of a jig according to the 9th aspect and thus positionally determining a divided coil.

According to the 11th aspect of the present invention, an automobile equipped with an electrically operated steering system comprising a rotating electrical machine according to the 6th aspect.

Since, according to the present invention, by using a continuously wound coil of which the front half portion and the rear half portion are wound in opposite senses as a continuously wound coil for each of the U phase, the V phase, and the W phase, it is possible to make a stator coil with 2-in series 2-in-parallel Y connected wiring, and it is possible to position the neutral points of all of these three coils in the same location, so that it is possible to connect these neutral points together with a simple connection terminal at this one spot, and thus it is possible to assemble this rotating electrical machine without using any connection wiring plate. Since no connection wiring plate need be used, accordingly it is possible to provide at lower cost an electric motor having a more compact structure.

DESCRIPTION OF THE PREFERRED EMBODIMENTS

The motor according to the present invention is one that utilizes permanent magnets in its rotor, and that is aimed at high output applications requiring compactness and high output. As an exemplary embodiment, the application of the present invention, to a motor that has 8 poles and 12 slots will now be explained in the following with reference to the drawings.

Figure 1:
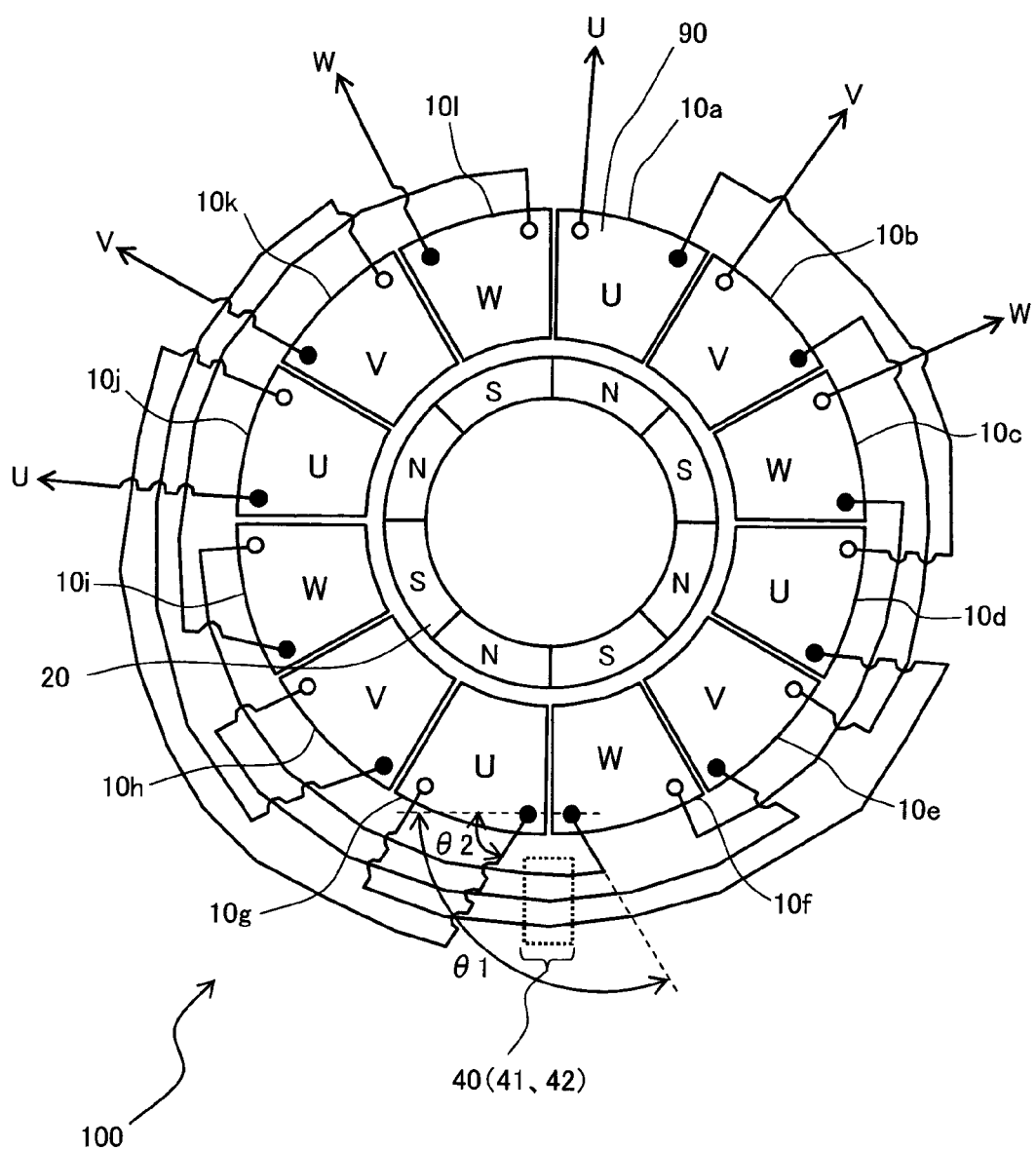
FIG. 1 is a figure schematically showing the connection wiring of a 12 slot stator coil of an embodiment of the present invention.

FIG. 1 is a figure schematically showing the connection wiring for the coils of a motor according to the present invention. This motor 100 is a concentrated winding motor that employs an inner rotor type divided core, and has an interior rotor 20 and a stator 90 outside the rotor 20. The example that will be explained in this embodiment is an 8 pole 12 slot motor. It should be understood that the structure of the motor 100 disclosed in the following explanation is only one example; of course the number of poles and the number of slots of the motor could be varied as appropriate, provided that the scope of the present invention is not departed from. The stator 90 shown in FIG. 1 has 12 coils 10a through 10l linked together in a ring, and the rotor 20 is disposed inside this ring via a predetermined gap. Magnets are provided on the exterior of the rotor 20, and are arranged so that 8 magnetic poles are spaced around its periphery at equal angular intervals, with N poles and S poles alternating.

For the coils 10a through 10l shown in FIG. 1, the starts of their windings are denoted by "○" symbols, while the ends of their windings are denoted by "●" symbols. The four coils 10a, 10d, 10g, and 10j for the U phase are wound as a continuous winding via crossover wires, and the coils 10a and 10d are wound in the same direction as one another, while the coils 10g and 10j are wound in the opposite direction. And the four coils 10b, 10e, 10h, and 10k for the V phase are also wound as a continuous wiring with their directions of winding exhibiting the same pattern, and the same is true for the four coils 10c, 10f, 10i, and 10l for the W phase. Accordingly, with the structure of the motor 100 as described above, the three neutral points of the set of four series-connected coils for the U phase, the set of four series-connected coils for the V phase, and the set of four series-connected coils for the W phase are located in one region 40 (or 41, 42) (shown as enclosed by the dotted line) where the three central crossover wires of these three sets of four continuous coils overlap. It should be understood that, in this example, each of the sets of four coils for the U phase, the V phase, and the W phase constitutes one group of coils, with the direction of winding of the two coils in the front half of each group being opposite to the direction of winding of the two coils in the rear half of that group.

Figure 2:
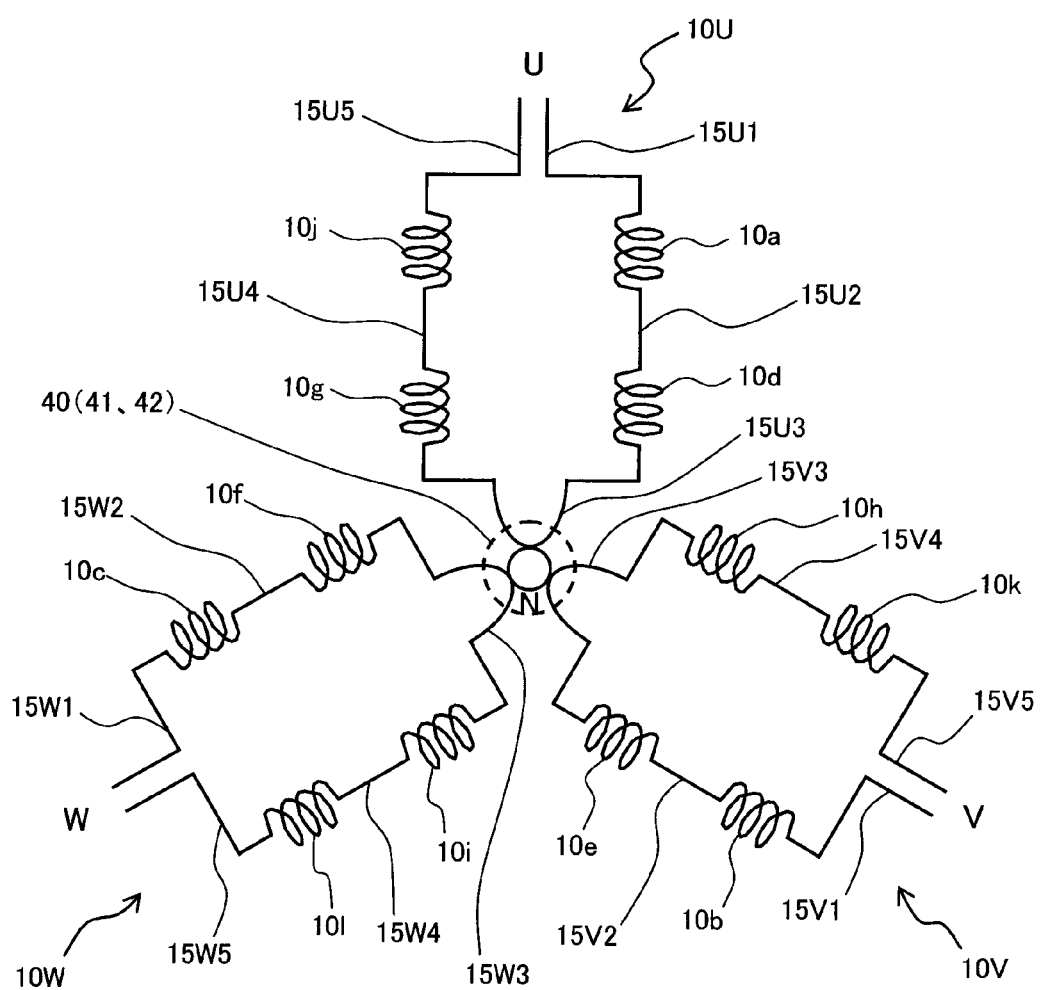
FIG. 2 is a connection diagram showing the neutral point connection of this 12 slot stator coil of an embodiment of the present invention.

FIG. 2 is a connection diagram for this stator 90 of the motor 100 according to the present invention. The coil set 10U of the U phase consists of an input wire 15U1, the coil 10a, a crossover wire 15U2, the coil 10d, a central crossover wire 15U3, the coil 10g, a crossover wire 15U4, the coil 10j, and an input wire 15U5, connected together in series in that order. The coils 10a and 10d are wound in the same direction as one another, and the coils 10g and 10j are wound in the direction opposite thereto (thus being wound in the same direction as one another). And the directions of winding of the coil set 10V for the V phase and of the coil set 10W for the W phase exhibit the same pattern. In other words, the motor 100 according to the present invention has a 2-in-series 2-in-parallel Y connected wiring pattern. Here, the central portion of the coil set 10U is the central crossover wire 15U3, the central portion of the coil set 10V is the central crossover wire 15V3, and the central portion of the coil set 10W is the central crossover wire 15W3; and, by providing a neutral point connection terminal 30 at which these are connected together at 40 (or 41, 42), it is possible to ensure that all of the 4 continuously wound coils for each phase are coils of the same phase, so that it is possible for this construction to function as a stator 20 for an 8 pole 12 slot motor.

Figure 3:
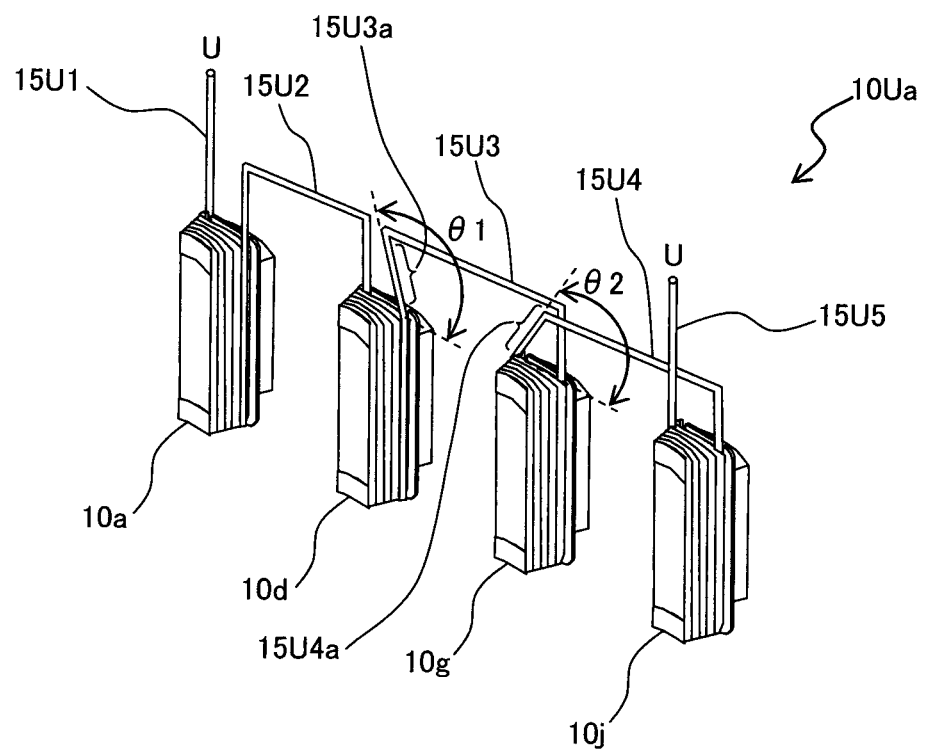
FIG. 3 is a perspective view for a first embodiment of the present invention, showing a structure in which four continuously wound coils constitute one phase of the stator coil.

Referring to FIG. 3, the construction of the four continuous coils of one phase of a rotating electrical machine that is a first embodiment of the present invention will be explained by referring to the coil 10Ua for the U phase as an example. As shown in FIG. 3, in this coil 10Ua for the U phase, the four coils 10a, 10d, 10g, and 10j are provided side by side in a line, and these coils are connected by the crossover wires 15U2, 15U3, and 15U4 into one continuous winding at approximately equal intervals. And the input wires 15U1 and 15U5 are provided at the ends of this winding, thus constituting input wires thereto. Here, in the crossover wire 15U3 that is the central portion of the U phase coil 10Ua, the crossover wire portion 15U3a at the end of the winding of the second coil (i.e. of the coil 10d) is bent at an angle θ1 of greater than 90° in the winding direction, so that this crossover wire is bent closer to the core. Furthermore, the crossover wire portion 15U4a at the end of the winding of the third coil (i.e. of the coil 10g) is bent at an angle θ2 of less than 90° in the winding direction, so that this crossover wire is bent closer to the core. The coil 10Va for the V phase and the coil 10Wa for the W phase have similar structures.

Here, the crossover wire at the end of the winding of the second coil, that corresponds to the central portion of these four coils in sequence, is bent at an angle θ1 of greater than 90° in the winding direction, so that this crossover winding is bent closer to the core, and the crossover wire at the end of the winding of the third coil bent at an angle θ2 of less than 90° in the winding direction, so that this crossover wire is bent closer to the core, as explained below, it becomes possible to install the single connection terminal 30 to the three neutral points, and it becomes possible to ensure sufficient space for fitting the electrodes.

Figure 4:
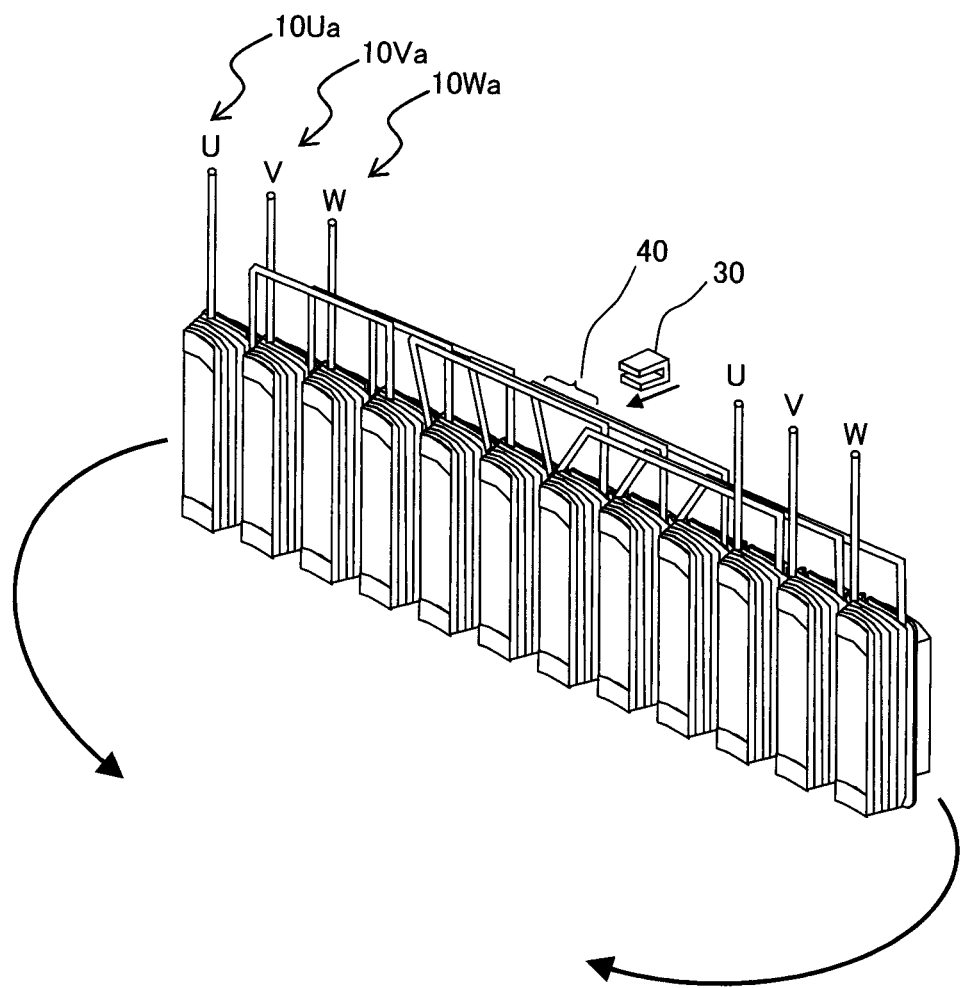
FIG. 4 is a perspective view for this first embodiment, showing the way in which three coil groups for the three phases of the stator coil, each consisting of four coils in a continuous winding, are mutually superimposed so as to provide a common neutral point for connection.

FIG. 4 shows the construction according to which the three sets of four continuous coils for each of the three phases are overlapped over one another, in this first embodiment of the present invention. The coils are overlapped by being lined up side by side in the order: the coil 10Wa for the W phase, then the coil 10Va for the V phase, and then the coil 10Ua for the U phase. Here, by the crossover wires at the central portions of the coil sets being angled as previously described, a space 40 for neutral point connection is defined at the central portions of the coil 10Ua for the U phase, the coil 10Va for the V phase, and the coil 10Wa for the W phase. A connection terminal 30 made from cladding material or the like is inserted at this neutral point connection portion 40, and connection wiring for the motor 100 is implemented by fusing connection with contacting the fusing electrodes to this connection terminal. Furthermore, the stator 20 can be completed by bending these coils, initially laid out side by side in a line, around into an annulus.

Figure 5:
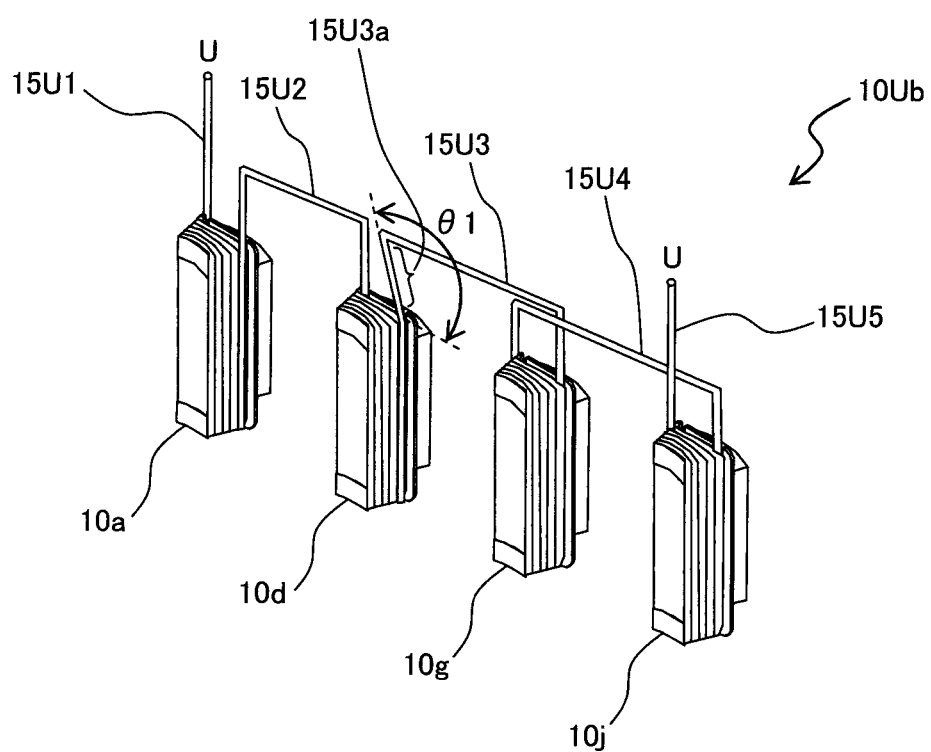
FIG. 5 is a perspective view for a second embodiment of the present invention, showing a structure in which four continuously wound coils constitute one phase of the stator coil.
Figure 6:
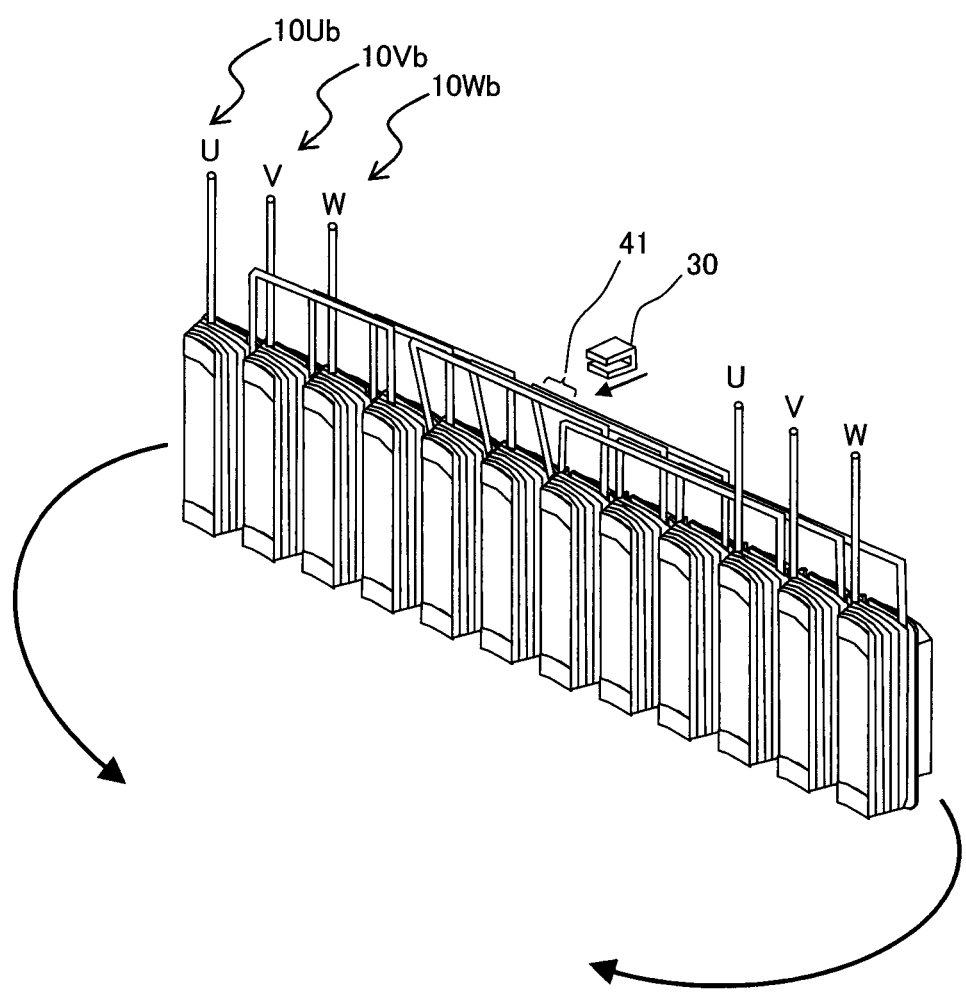
FIG. 6 is a perspective view for this second embodiment, showing the way in which three coil groups for the three phases of the stator coil, each consisting of four coils in a continuous winding, are mutually superimposed so as to provide a common neutral point for connection.

Referring to FIG. 5, the construction of the four continuous coils of one phase of a rotating electrical machine that is a second embodiment of the present invention will be explained by referring to the coil 10Ub for the U phase as an example. The difference from the construction of FIG. 3 is the feature that, in the crossover wire 15U3 that is the central portion of the coil 10Ub for the U phase, only the crossover wire portion 15U3*a* at the end of the winding of the second coil (i.e. of the coil 10*d*) is bent at an angle θ1 of greater than 90° in the winding direction, so that this crossover wire is bent closer to the core. As a result it will be understood that, as shown in FIG. 6, the neutral point connection portion 41 can function adequately as a connection spot, although its width is narrowed down as compared to that of the neutral point connection portion 40 shown in FIG. 4.

Figure 7:
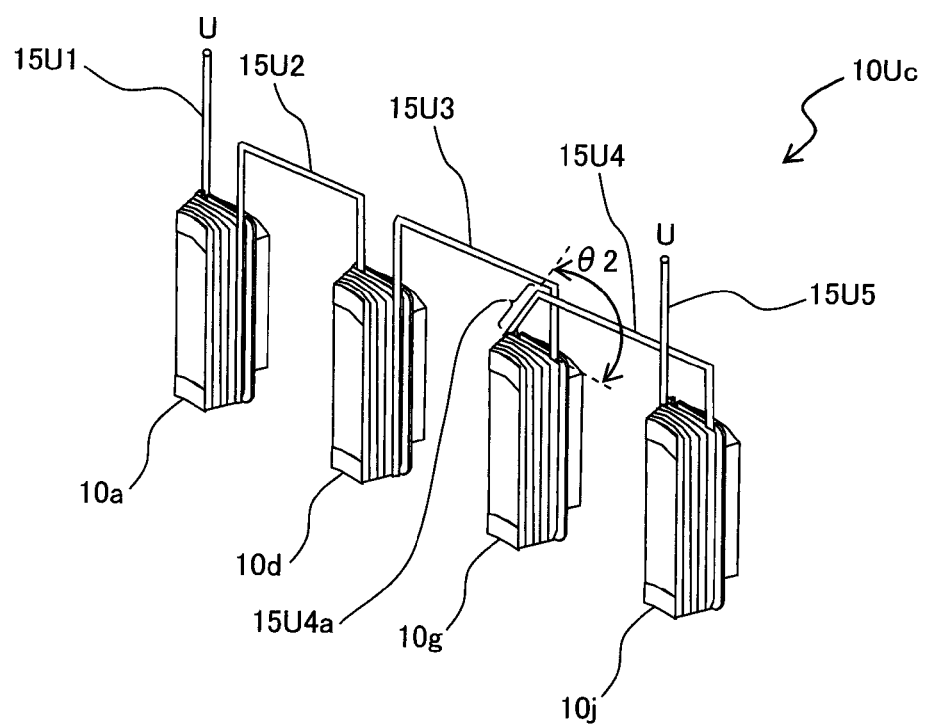
FIG. 7 is a perspective view for a third embodiment, showing a structure in which four continuously wound coils constitute one phase of the stator coil.
Figure 8:
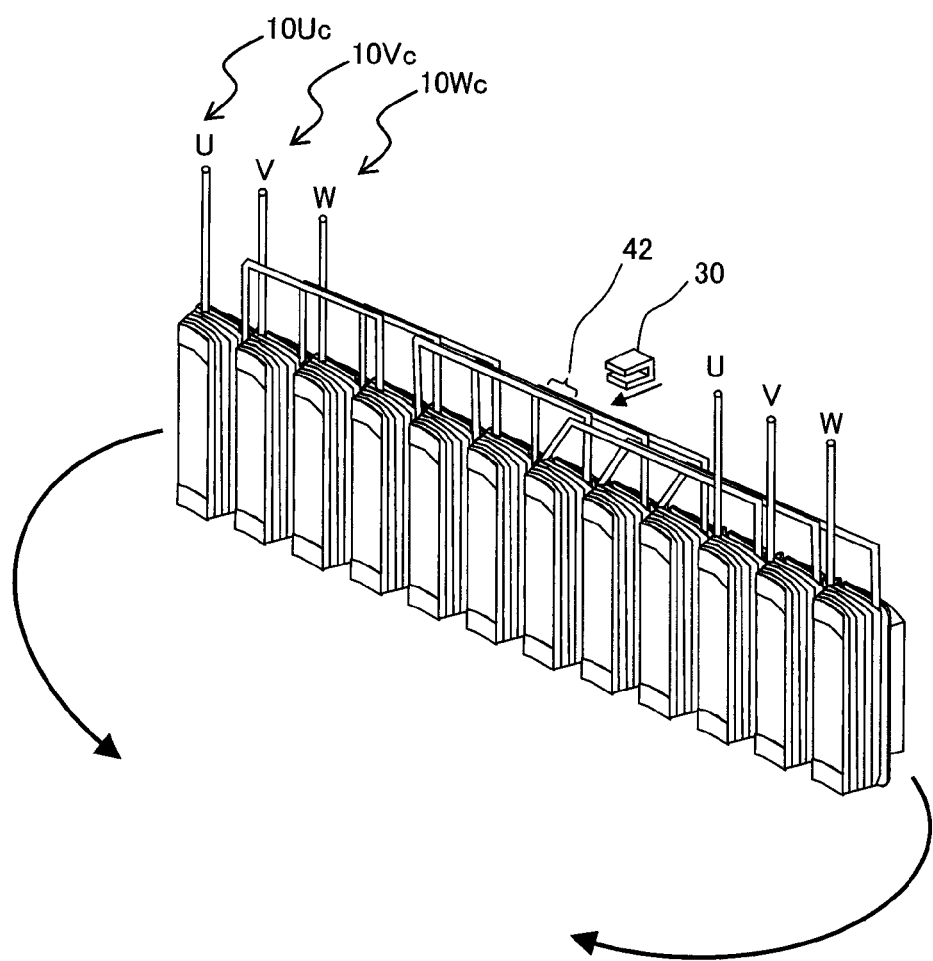
FIG. 8 is a perspective view for this third embodiment, showing the way in which three coil groups for the three phases of the stator coil, each consisting of four coils in a continuous winding, are mutually superimposed so as to provide a common neutral point for connection.

Referring to FIG. 7, the construction of the four continuous coils of one phase of a rotating electrical machine that is a third embodiment of the present invention will be explained by referring to the coil 10Uc for the U phase as an example. The difference from the construction of FIG. 3 is the feature that, in the crossover wire 15U3 that is the central portion of the coil 10Ub for the U phase, only the crossover wire portion 15U4*a* at the end of the winding of the third coil (i.e. of the coil 10*g*) is bent at an angle θ2 of less than 90° in the winding direction, so that this crossover wire is bent closer to the core. As a result it will be understood that, as shown in FIG. 8, the neutral point connection portion 42 can function adequately as a connection spot, although its width is narrowed down as compared to that of the neutral point connection portion 40 shown in FIG. 4.

Figure 9:
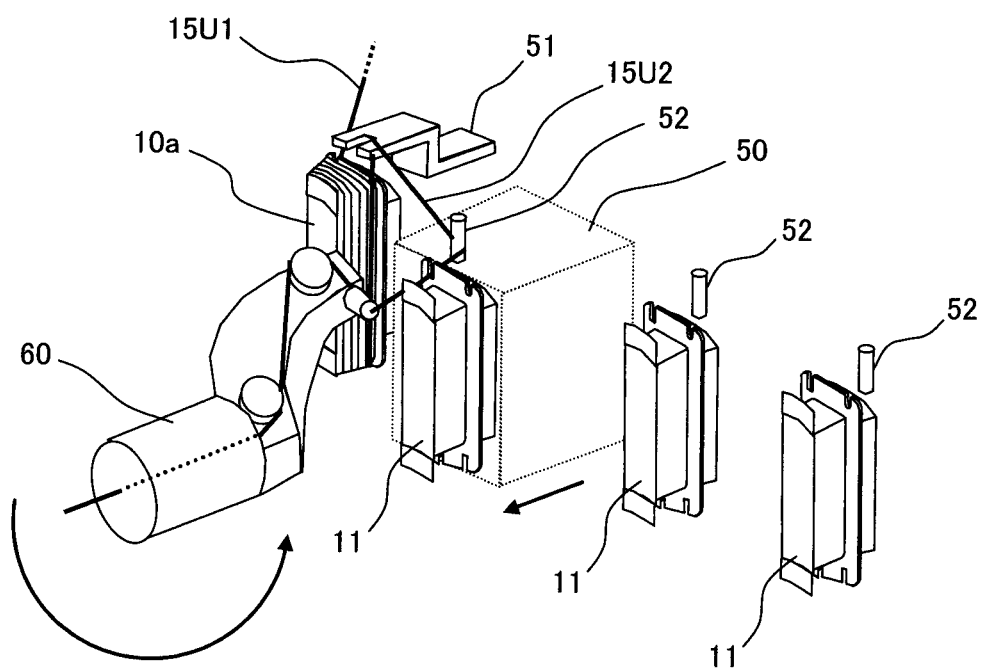
FIG. 9 is a perspective view for explanation of a method of winding a group of four coils in a continuous winding for one phase of a stator coil according to an embodiment of the present invention.

An example of the method according to the present invention for winding the stator coils described above will now be explained with reference to FIGS. 9 through 13, as particularly applied to the U phase coils 10Ua, 10Ub, and 10Uc respectively shown in FIGS. 3, 5, and 7. In FIG. 9, only a tip end portion 60 of a flyer of a wire winding machine is shown. This flyer 60 is mounted at the end of a three orthogonal-axis robot, and can form not only the windings, but also the crossover wires. The divided cores 11 are mounted upon mechanisms with back and forth movements 50. The cores 11 can be moved forwards and backwards by the mechanisms 50, so that a space for winding, i.e. the winding orbit of the flyer 60, is guaranteed. Pins 52 having circular cylindrical shapes are provided protruding upwards upon these mechanisms 50, for fixating the crossover wires at the start of winding. Moreover, movable pins 51 shaped like the teeth of a comb are mounted upon the mechanisms 50, for fixing the crossover wires when winding is completed. While this feature is not shown in FIG. 9, it should be understood that, in these divided cores 11, at their central inner portions where the coils are not wound, deep holes are provided from below in the figures. These deep holes are provided for positional determination of the divided cores, by holding members that are provided upon an assembly jig being fitted into these deep holes during assembly of the stator coil.

The winding method will be explained by taking the first coil and the second coil as an example. After the winding of the first coil (10*a*) with the flyer 60 has been completed, the comb tooth shaped movable pins 51 are moved forward, so as to fixate the coil conductor at the end of winding. The flyer 60 waits at this position. Next, the first coil (10*a*) is retracted backwards by the mechanisms with back and forth movements 50. And next the divided cores 11 are advanced forwards by the mechanisms 50, and the flyer 60 is moved by the three orthogonal-axis robot to form the crossover wire 15U2. Then the coil conductor is hitched to a cylindrical shape pin 52, and is wound downwards upon a divided core 11, thus starting the winding of the second coil. Subsequently similar operations are repeated, and thereby a continuous winding consisting of four coils is formed.

Figure 10:
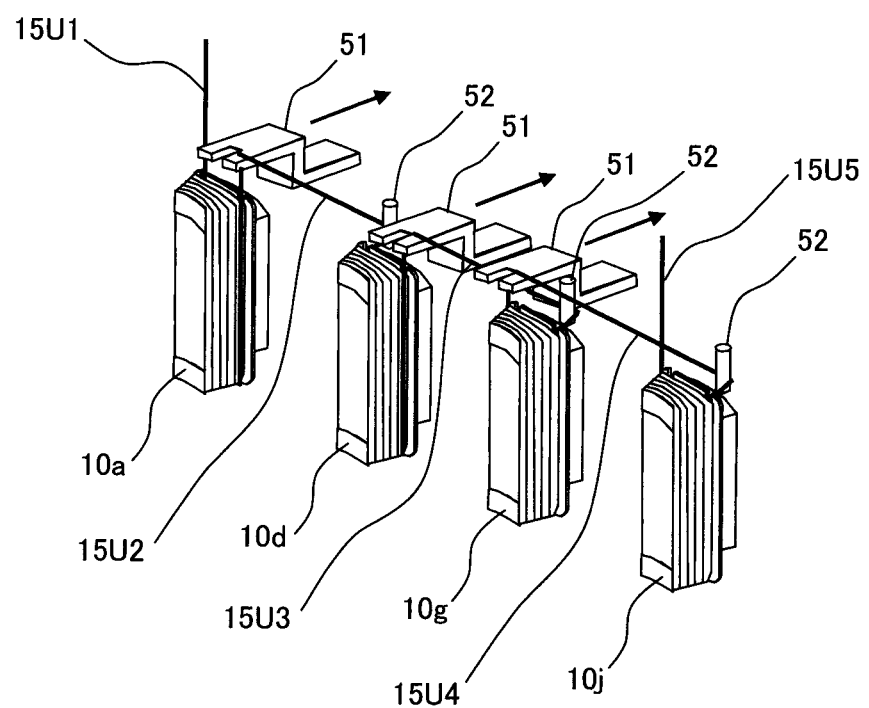
FIG. 10 is another perspective view for explanation of a method of winding a group of four coils in a continuous winding for one phase of a stator coil according to an embodiment of the present invention.

FIG. 10 shows the state of these four coils after the continuous winding thereof has been completed. The mechanisms 50 are all in the retracted state, which is not shown in the figure, and the terminal wire is cut away from the nozzle of the flyer 60, thus forming the input wire 15U5. The flyer 60 is in the state of being retracted to its original position. In this state, all of the comb tooth shaped movable pins 51 are retracted from the coils.

Figure 11:
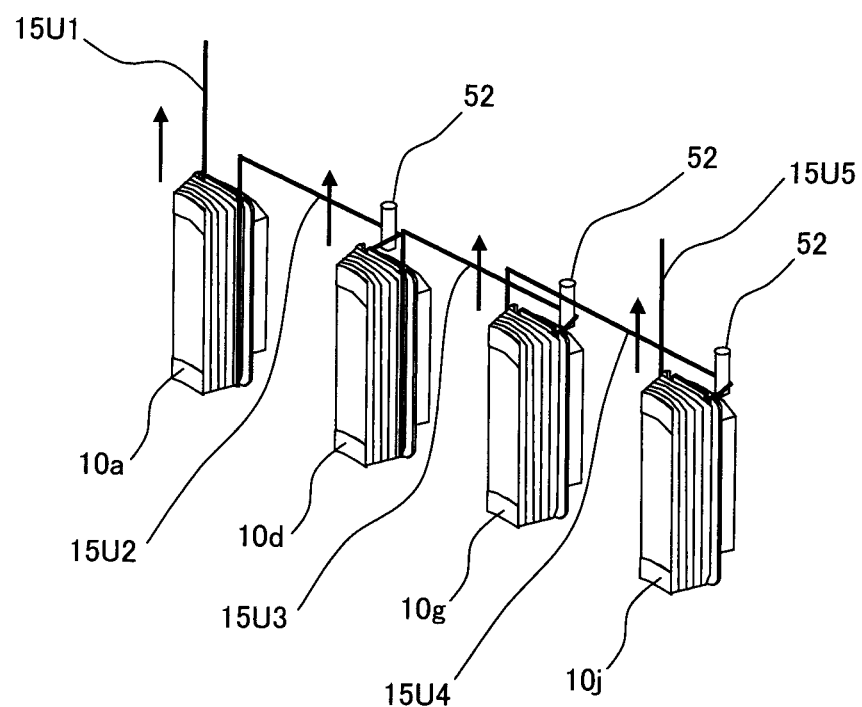
FIG. 11 is a further perspective view for explanation of a method of winding a group of four coils in a continuous winding for one phase of a stator coil according to an embodiment of the present invention.
Figure 12:
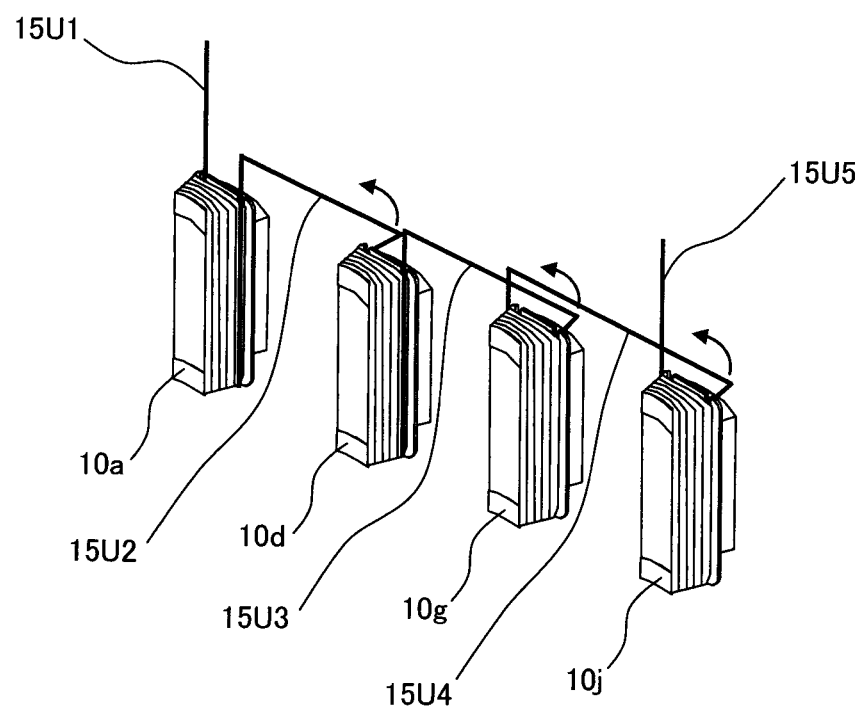
FIG. 12 is yet another perspective view for explanation of a method of winding a group of four coils in a continuous winding for one phase of a stator coil according to an embodiment of the present invention.
Figure 13:
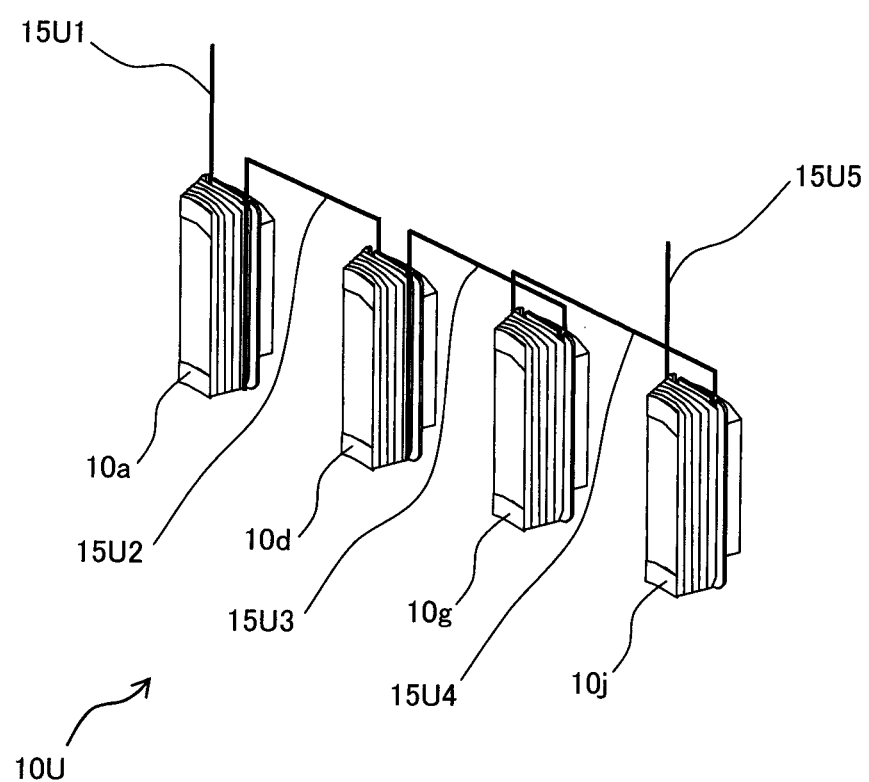
FIG. 13 is still another perspective view for explanation of a method of winding a group of four coils in a continuous winding for one phase of a stator coil according to an embodiment of the present invention.

Next, as shown in FIG. 11, the four continuous coils are raised upwards, so that these coils are taken off from the upwardly protruding circular cylindrical pins 52. Moreover, as shown in FIG. 12, when the bridging wires 15U2, 15U3, and 15U4 are formed so as to rise upwards, the coil group 10U for the U phase consisting of four continuous coils is completed, as shown in FIG. 13.

Figure 14:
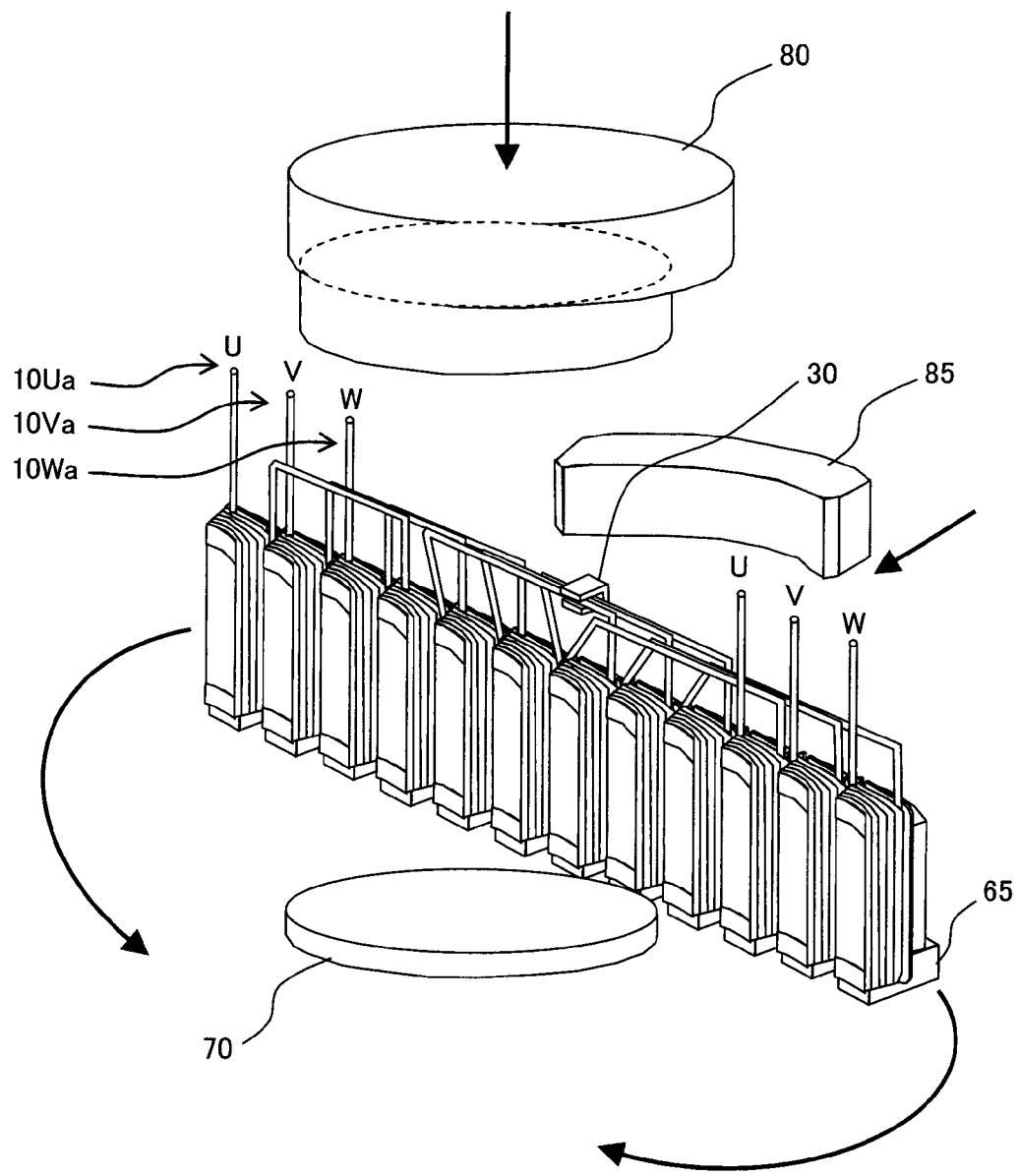
FIG. 14 is a perspective view for explanation of a method of assembling three groups of four continuously wound coils for the three phases of a stator coil according to an embodiment of the present invention.

Finally, the method of assembling the three groups of four continuous coils for the three phases will be explained with reference to FIG. 14. The coils are superimposed so that the coils are lined up side by side, in order from the coil 10Wa for the W phase, through the coil 10Va for the V phase, to the coil 10Ua for the U phase, as shown in FIG. 14. In other words, these three groups of coils are combined so that they become a single stator coil. These three groups of four continuously wound coils for the three phases are fitted upon a divided core support jig 65 that is flexibly bent like a bellows (refer to FIG. 15). This divided core support jig 65 can be bent around into a ring by being pushed against a block 70 that is formed in the shape of a circular cylinder. At this time, since the crossover wires of each coil are not fixed and their shapes are not stable when the coils are bent around into a ring, the crossover wires may be formed at their desired positions by performing this operation of assembling the coil groups into a ring while pushing an internal crossover wire formation block 80 against the circumferentially internal side of the crossover wires and also pushing an external formation block 85 against the circumferentially external side of the crossover wires.

Here, the fact that the crossover wire formation block 80 is made in an umbrella shape like a mushroom, is in order to prevent the crossover wires from escaping upwards during this formation process. Due to this, it is also possible to make the crossover wires of the desired height. After the coils have been assembled into a ring, the stator 20 can be completed by connecting the neutral points with the connection terminal 30.

Figure 15:
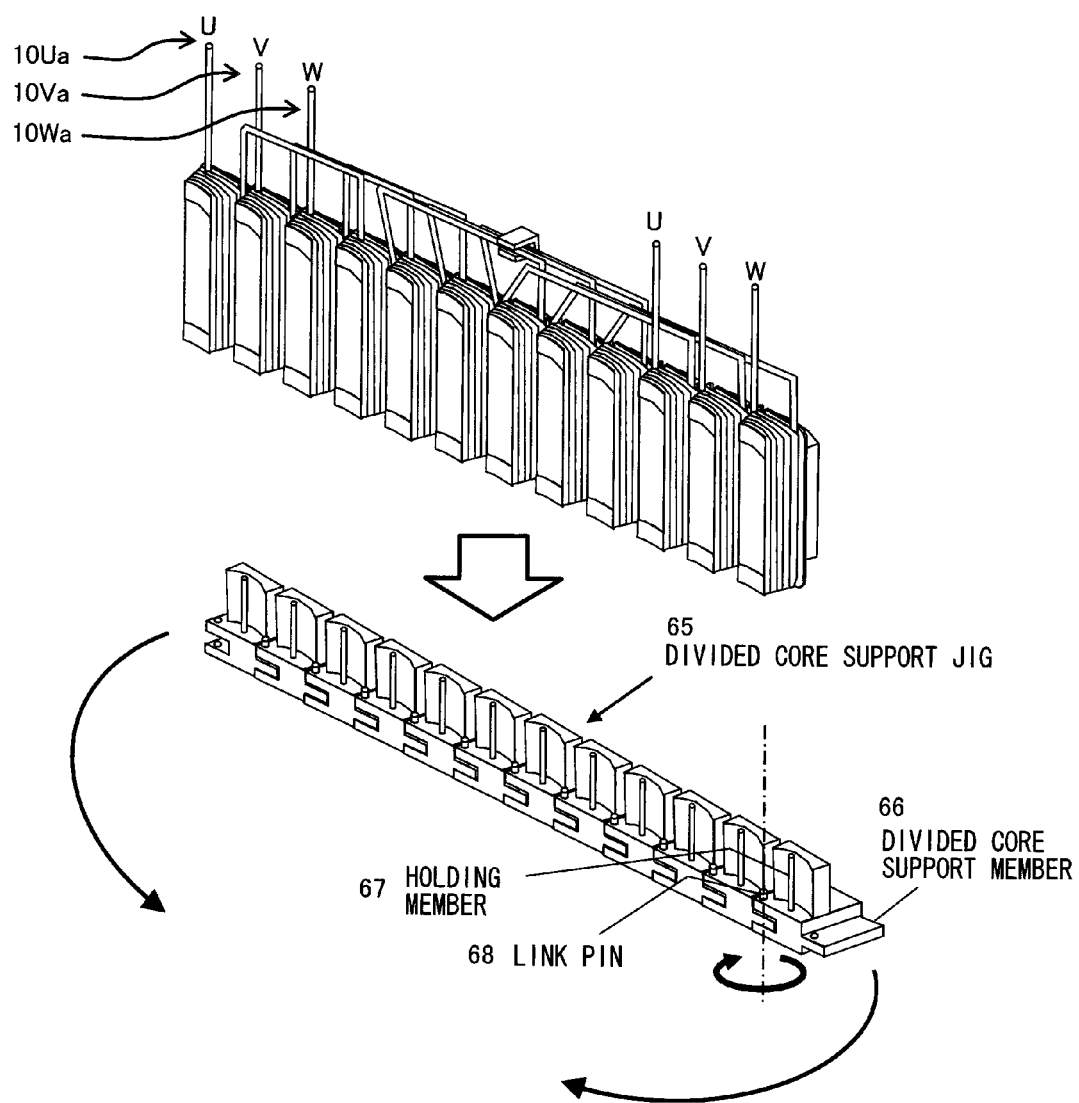
FIG. 15 is a perspective view of a divided core support jig that is used in the assembly method for three groups of four continuously wound coils for the three phases of a stator coil according to an embodiment of the present invention shown in FIG. 14.

It should be understood that this divided core support jig 65 that is flexibly bent is built as a chain connection of the same number of divided core support members 66 as the number of divided cores of the stator coil. As shown in FIG. 15, adjacent ones of these divided core support members 66 are linked together by link pins 68, and can rotate with respect to one another around these link pins 68 as centers. In the state in which, as explained above, the three groups of coils for the three phases are fitted upon this divided core support jig 65 that is constituted by these divided core support members 66 being linked together, the divided core support jig 65 can be bent around into a ring by being pressed against the circular cylindrical block 70. Furthermore, a holding member 67 for holding one of the divided cores is provided to each of the divided core support members 66. Each of these holding members 67 is adapted to be fitted into one of the deep holes that, as mentioned above, are provided in the divided cores.

Figure 16:
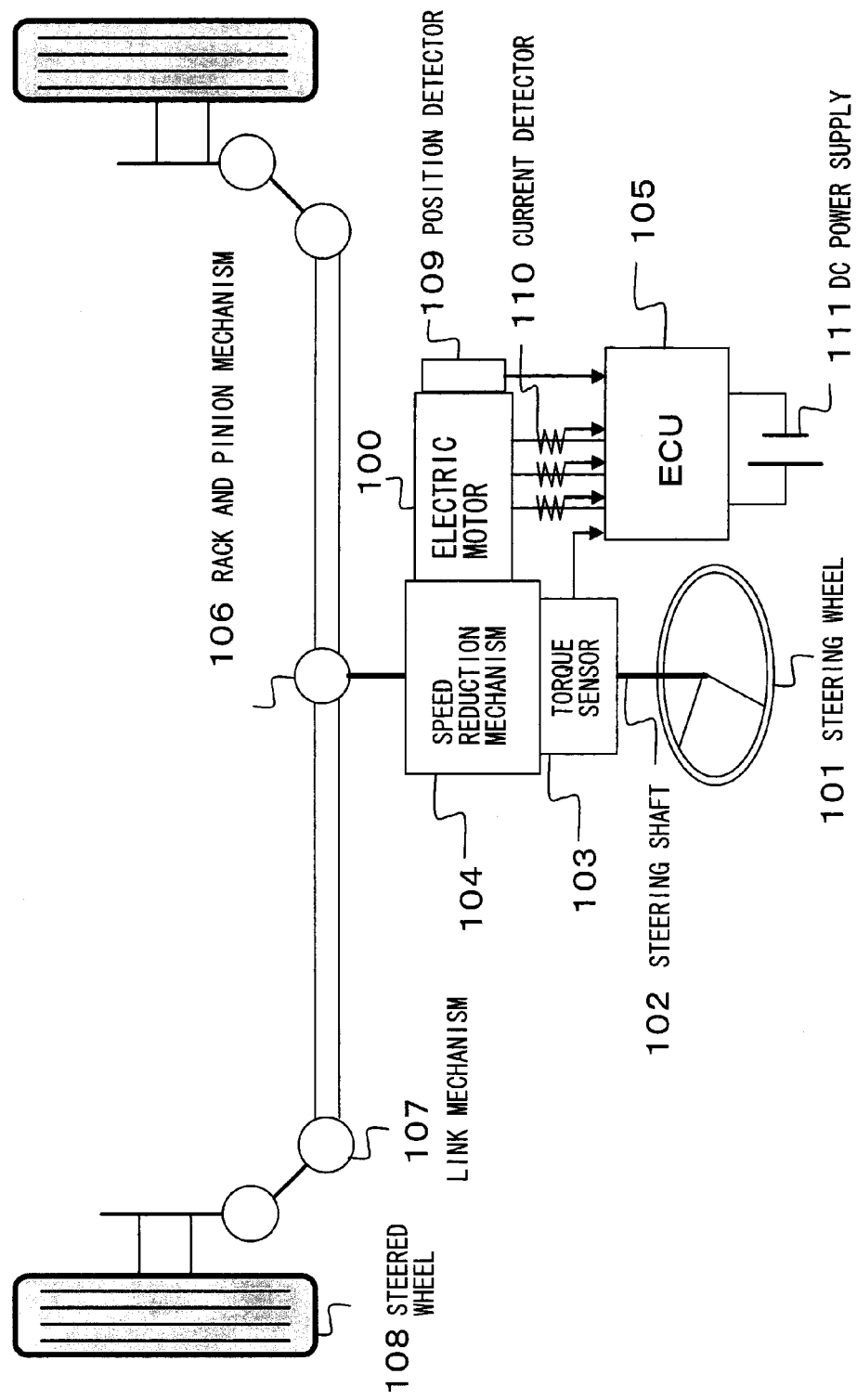
FIG. 16 is a schematic figure showing a case in which an electric motor that incorporates a stator coil according to the present invention has been applied to an electrically operated power steering system of an automobile.

FIG. 16 is a schematic figure showing a situation in which an electric motor 100 that is equipped with a stator coil according to the present invention is used in an electrically operated power steering system for an automobile. When the driver operates a steering wheel 101, this rotates a steering shaft 102, and a torque sensor 103 that is fitted to the steering shaft 102 detects this rotational steering operation. On the basis of the result of this detection of steering operation by the torque sensor 103, an electronic control device (ECU) 105 determines a rotational torque for assisting steering operation by the driver, and, in order for this rotational torque to be outputted from the motor 100, three phase electrical current is supplied to the motor 100 from an electrical current output unit that is provided to the ECU 105. The rotational torque generated by the motor 100 is transmitted via a speed reduction device 104 to a rack and pinion mechanism 106 and is converted thereby into rectilinear motion, and steers the steered wheels 108 of the vehicle via link mechanisms 107.

It should be understood that a position detector 109 and a current detector 110 are provided for detecting, respectively, the rotational position of the motor 100, and the three phase currents being supplied to the motor 100. On the basis of the values detected by these sensors, the ECU 105 adjusts the three phase currents supplied to the motor, so as to generate the appropriate rotational torque. A DC power supply 111 is a power supply for providing power for driving the circuitry in the ECU 105 to perform these various control functions, and for providing three phase electrical current to the motor 100 for generating rotational torque. The space for mounting various components in the interior of an automobile is very restricted, and an electric motor that has been made more compact by the application of the present invention is extremely suitable for use in the type of electrically operated power steering system described above.

In the above explanation, a case in which the stator coil of the present invention has been applied to an 8 pole 12 slot electric motor has been described. But the stator coil construction of the present invention, and the method of manufacturing a stator coil of the present invention, are not to be considered as being limited in their application to an 8 pole 12 slot electric motor; they could also be applied to a stator coil for a 4 pole 6 slot motor, or for a 12 pole 18 slot motor, or for a 16 pole 24 slot motor, or the like, or indeed to a stator coil for any electric motor having 4N poles and 6N slots, where N is a natural number. In this case, the coil group for each of the U phase, the V phase, and the W phase will be a continuous winding having 2N coils, and the front half portion of each of these continuous windings, having N coils, will be wound in one direction, while the rear half portion, also having N coils, will be wound in the opposite direction.

It should be understood that the embodiments described above may be utilized singly or in combination. This is because the beneficial effect of each embodiment may be obtained either singly or synergistically. Furthermore, the present invention is not to be considered as being limited in any way by any of the features of the embodiments described above, provided that the distinguishing features of the present invention are not lost.

What is claimed is:

1. A stator coil used in a rotating electrical machine, comprising:
   three groups of coils, wherein:
   coils of each of the three groups of coils are wound continuously upon divided cores with one or more crossover wires, in which 2N coils (where N is a natural number) are arranged at approximately regular intervals, wherein a winding direction of N coils, which are first through Nth continuously wound coils, of a front half of the 2N coils, and a winding direction of rear half coils which are (N+1)-th through (2N)-th continuously wound coils, are opposite; and
   neutral points of the three groups of coils are connected by connecting together central crossover wires at central portions of the three groups of coils with a connection terminal, the central crossover wires each extending from a winding end of an Nth coil to a winding start of a (N+1)-th coil in each of the three groups of coils and being connected together with the connection terminal at a region where the central crossover wires overlap each other in the three groups of coils being assembled together.

2. A stator coil according to claim 1, wherein a portion of a crossover wire extending directly from a winding end of an Nth coil is bent closer to a core of the Nth coil, in each of the three groups of coils, so as to ensure a space for the connection terminal at the region where the central crossover wires overlap each other.

3. A stator coil according to claim 1, wherein a portion of a crossover wire extending directly from a winding end of an (N+1)-th coil is bent closer to a core of the (N+1)-th coil, in each of the three groups of coils, so as to ensure a space for the connection terminal at the region where the central crossover wires overlap each other.

4. A stator coil according to claim 1, wherein a portion of a crossover wire extending directly from a winding end of an Nth coil is bent closer to a core of the Nth coil, and a portion of a crossover wire extending from a winding end of an (N+1)-th coil is bent closer to a core of the (N+1)-th coil, in each of the three groups of coils, so as to ensure a space for the connection terminal at the region where the central crossover wires overlap each other.

5. A stator coil according to claim 1, wherein:
   the three groups of coils are used respectively for U phase, V phase.

* * * * *